United States Patent [19]

Vinekar et al.

[11] 4,410,907
[45] Oct. 18, 1983

[54] BURST GATE KEYING AND BACK PORCH CLAMP PULSE GENERATOR

[75] Inventors: Sanjay R. Vinekar; James Hettiger; Karl L. Friedline, all of Indianapolis, Ind.

[73] Assignee: RCA Corporation, New York, N.Y.

[21] Appl. No.: 322,005

[22] Filed: Nov. 16, 1981

[51] Int. Cl.³ .............................................. H04N 9/44
[52] U.S. Cl. .................... 358/20; 358/148; 358/150
[58] Field of Search ............ 358/17, 19, 20, 21 R, 358/148, 150, 168

[56] References Cited

U.S. PATENT DOCUMENTS

| | | | |
|---|---|---|---|
| 4,313,130 | 1/1982 | Yost | 358/20 |
| 4,316,214 | 2/1982 | Yost | 358/20 |
| 4,337,478 | 6/1982 | Harlan | 358/20 |

FOREIGN PATENT DOCUMENTS

| | | | |
|---|---|---|---|
| 938023 | 12/1973 | Canada | 358/20 |
| 5235520 | 3/1977 | Japan | 358/20 |
| 1251235 | 10/1971 | United Kingdom | |
| 1351807 | 5/1974 | United Kingdom | |
| 1360445 | 7/1974 | United Kingdom | |
| 1477072 | 6/1977 | United Kingdom | |
| 1559559 | 1/1980 | United Kingdom | |
| 1565541 | 4/1980 | United Kingdom | |
| 2048605 | 12/1980 | United Kingdom | |

*Primary Examiner*—Michael A. Masinick
*Attorney, Agent, or Firm*—Paul J. Rasmussen; William H. Meise; Scott J. Stevens

[57] ABSTRACT

A pulse generator for a television receiver produces keying pulses during the video signal back porch interval in order to energize burst gate and brightness control circuitry. The pulse generator is triggered by horizontal sync pulses under strong, noise-free video signal conditions. As the quality of the video signal and the horizontal sync pulses deteriorate due to noise or a weakening signal, the pulse generator is triggered by horizontal retrace pulse in order to provide keying pulses under all video signal conditions.

9 Claims, 13 Drawing Figures

BURST GATE KEYING AND BACK PORCH CLAMP PULSE GENERATOR

This invention relates to circuits which generate keying signals for use in a color television receiver and, in particular, keying signals for burst gate and signal clamping circuits.

BACKGROUND OF THE INVENTION

The composite video signal for a color television program includes luminance and chrominance information which occurs during the image interval of a horizontal scan line. This information is decoded by appropriate receiver luminance and chrominance processing circuitry and is used to control operation of respective color designated electron beam producing structures. The composite video signal also contains information in a video blanking interval of each horizontal scan line. The blanking interval includes horizontal sync pulses and a "back porch" region which incorporates a chrominance burst signal comprising a number of cycles at the color subcarrier frequency, which is approximately 3.58 MHz in the U.S. This chrominance burst signal is used to synchronize the 3.58 MHz color oscillator of the receiver so that the receiver-decoded chrominance information accurately reflects the original program information. The burst signal is applied to the appropriate chrominance processing circuitry via a burst gate which desirably passes only burst information. The burst gate is energized by a burst gate keying pulse which occurs during the back porch interval of the composite video signal.

The composite video signal is also utilized by luminance signal processing circuits to provide the proper drive level of the electron beam producing structures. The burst signal is removed from the composite video signal prior to the application of the video signal to the luminance processing circuits. The signal level of the composite signal during the back porch portion of the blanking interval is designated as a reference blanking level. This signal is used in some applications, to determine a black level reference to control the brightness of the reproduced picture. U.S. Pat. No. 4,197,557, issued to Tuma et al. and entitled "Brightness Control Circuit Employing a Closed Control Loop" describes an arrangement which compares the back porch level with a reference voltage determined by the receiver brightness control. The back porch level is then clamped to bring it into a desired relationship with the brightness reference voltage. Clamping of the blanking reference (back porch) level in this manner prevents video signal blanking level variations from causing undesirable changes in the picture brightness.

The aforementioned luminance-channel brightness control circuit and previously described chrominance-channel color burst gate utilize information contained in the back porch region of the horizontal video blanking interval. The back porch signal is sampled by the appropriate luminance and chrominance processing circuitry, which is energized by a keying pulse which occurs during the back porch interval. In some applications such as with the use of an integrated circuit, one keying pulse is used to energize both the brightness control or back porch clamp circuit and the burst gate. The timing and duration of this keying pulse is very important. The pulse must be of sufficient duration to key enough back porch information into the luminance and chrominance processing circuits. Also, the leading edge of the keying pulse must not occur too soon or the brightness control circuits may respond to the horizontal synchronizing pulse, rather than to the back porch information. The trailing edge of the keying pulse must not occur too late; otherwise, video information may be keyed into the burst gate, disrupting its operation.

U.S. Pat. No. 4,051,518, issued to Sendelweck and entitled "Burst Gate Pulse Generator" describes a keying pulse generator which produces an output pulse in timed relationship to horizontal synchronizing pulses. Since the horizontal synchronizing pulses occur at accurately timed fixed intervals, the resultant keying pulses will also be accurately timed. During some receiver operating conditions, however, such as when a weak signal is received or the weather is unfavorable, a significant amount of noise may be present in the video signal. This noise may obscure or even obliterate the horizontal sync pulses. In these situations, a horizontal sync responsive keying pulse generator may generate an improperly timed pulse or may generate no pulse at all. Such a situation may result in severely degraded receiver performance.

Additionally, if the keying pulse is also used by the previously described back porch clamp or brightness control circuit, the absence of a pulse may cause undesirable brightness variations or gray scale discoloration. It is important therefore that a keying pulse be provided under all receiver operating conditions. It is possible to generate a pulse triggered by horizontal retrace pulses, which are always present. However, due to deflection circuit loading variations, the retrace pulses may shift position from line to line. This may cause inaccurate timing of the keying pulses under some conditions.

SUMMARY OF THE INVENTION

The present invention provides a pulse generator which produces a pulse that can be used to energize brightness control circuits or a color burst gate. The pulse is produced in timed relationship to horizontal synchronizing pulses under strong, relatively noise-free signal condition. When the received signal is deteriorated or noisy, the pulse is generated with reference to the horizontal flyback pulse. In this way a pulse is produced under all signal conditions.

In accordance with the present invention, a television receiver incorporates a source of horizontal retrace pulses, a source of composite video signals having a back porch interval and a source of horizontal synchronizing pulses. Means for generating a keying pulse during the back porch interval comprises first means, responsive to being turned on by a retrace pulse and also responsive to being turned off by a retrace pulse after a predetermined time. Second means is coupled to the source of synchronizing pulses and to the first means. The second means delays the turn on of the first means until the termination of the synchronizing pulse of a given horizontal line.

BRIEF DESCRIPTION OF THE DRAWING

In the accompanying drawing.

DETAILED DESCRIPTION

Figure 1:
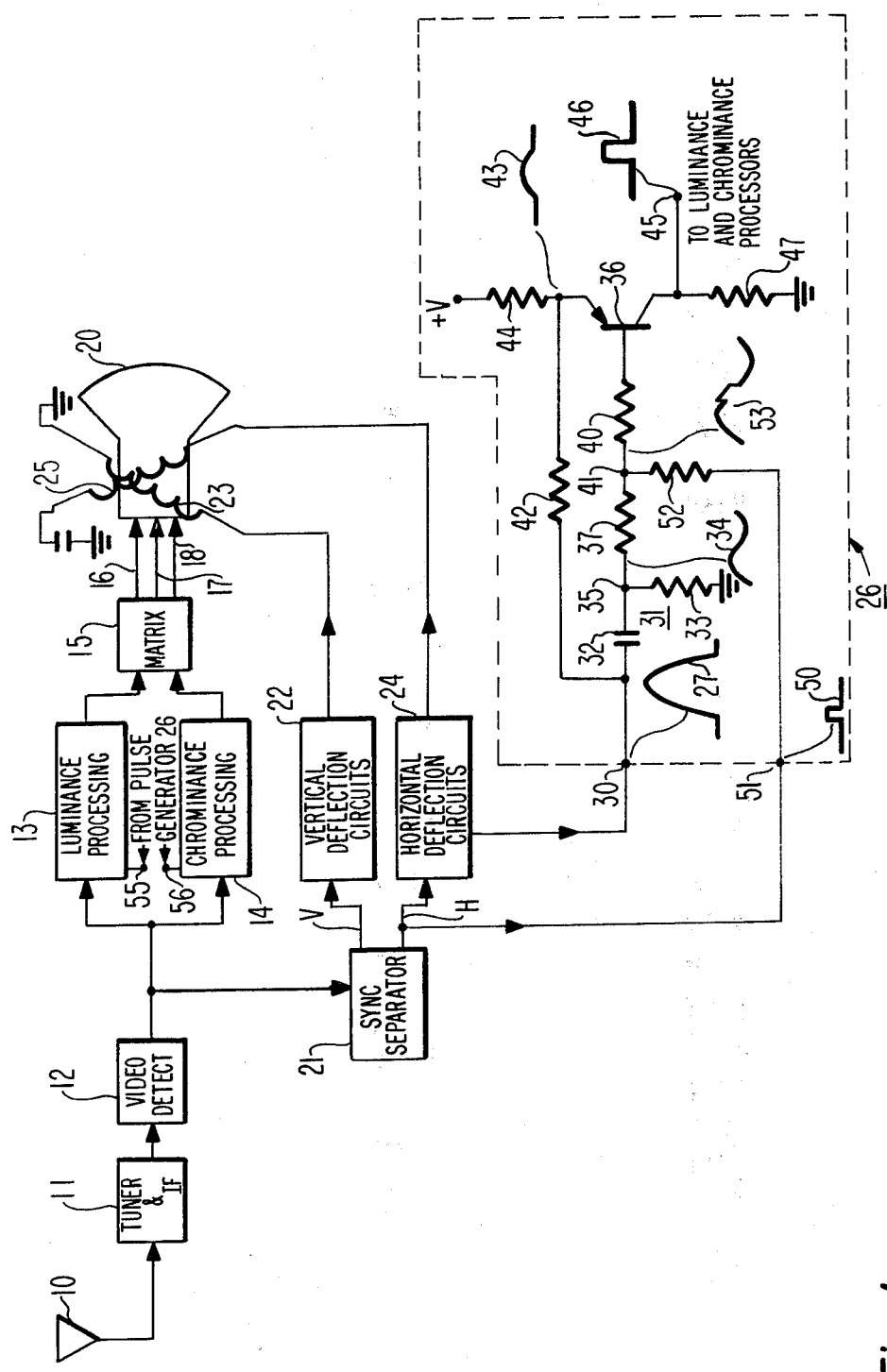
FIG. 1 is a schematic and block diagram of a portion of a color television receiver including a pulse generator in accordance with the present invention.

In the television receiver shown in FIG. 1, an antenna 10 receives modulated television signals which are applied to tuner and intermediate frequency (IF) circuits 11. The demodulated signal from tuner and IF circuits 11 is applied to a video detector 12 which generates a composite video signal. The composite video signal, comprising color, brightness and receiver control information is applied to luminance processing circuits 13 and chrominance processing circuits 14, which extract appropriate information from the signal. Luminance processing circuits 13 may, for example, include a brightness control circuit (not shown) which maintains desired picture brightness by controlling the blanking reference level of the back porch portion of the composite video signal. Chrominance processing circuits 14, for example, may include a burst gate which applies the color burst signal, also located in the back porch interval of the composite video signal, to a color oscillator in order to provide proper synchronization of the oscillator.

The processed luminance and chrominance information from the luminance and chrominance circuits 13 and 14 is combined by a matrix circuit 15 to produce red, green and blue drive signals 16, 17 and 18 which are applied to the electron gun assembly (not shown) of a kinescope 20.

The composite video signal from video detector 12 is also applied to a sync separator or stripper 21, which removes the horizontal and vertical synchronizing pulses from the composite video signal to form a composite sync signal. Sync separator 21 may also include, for example, a sync pulse integrator and a sync pulse differentiator for generating vertical and horizontal sync signals, respectively, from the composite sync signal. The vertical sync pulses are applied via line V to vertical deflection circuits 22, which generate a deflection current in vertical deflection coil 23 located on kinescope 20. The horizontal sync pulses are applied to horizontal deflection circuits 24 via line H. Horizontal deflection circuits 24 produce a deflection current in horizontal deflection coil 25, located on kinescope 20, which generates a deflection field that causes the electron beam produced by the electron gun assembly of kinescope 20 to be scanned across the display screen of kinescope 20.

The previously described burst gate of chrominance processing circuit 14 and brightness control circuit of luminance processing circuit 13 require an accurately timed keying pulse for proper operation. In accordance with the present invention there is shown in FIG. 1 a pulse generator 26 which generates a keying pulse that can be applied to luminance and chrominance processing circuits 13 and 14.

Horizontal retrace or flyback pulses 27 produced by horizontal deflection circuits 24 are applied to pulse generator 26 at a terminal 30. Retrace pulses 27 are then applied to a differentiator 31, comprising a capacitor 32 and a resistor 33, which forms a pulse 34 at a terminal 35. Pulse 34 is applied to the base of transistor 36 via resistors 37 and 40. A junction 41 is formed between resistors 37 and 40. Retrace pulses at terminal 30 are also applied to the emitter of transistor 36 via a resistor 42. A pulse 43 is thereby formed at the emitter of transistor 36. The emitter of transistor 36 is also coupled to a source of potential $+V$ by way of a resistor 44. The collector of transistor 36 is coupled to a grounded load resistor 47, across which an output pulse 46 is generated for application to an output terminal 45.

Horizontal synchronizing pulses 50 on line H from sync separator 21 are applied to pulse generator 26 at a terminal 51. These pulses 50 are applied to junction 41 through a resistor 52 to form a pulse 53 at terminal 41.

In operation, horizontal retrace pulses 27 are processed by differentiator circuit 31 to produce the sinusoidal signal 34. The voltage level of the negative-going portion of signal 34 is sufficient to turn PNP transistor 36 on. However, horizontal sync pulses 50, coupled into pulse generator 26 and combined with signal 34 to form signal 53, delay the turn-on of transistor 36 by decreasing the base-emitter voltage of transistor 36. The magnitude of the sync pulse component in signal 53 is determined by the strength and condition of the received video signal. For a strong signal, relatively free of noise, the sync pulse component will be of great enough magnitude to delay the turn-on of transistor 36 until the termination of the sync pulse component contributed by pulse 50. Conduction of transistor 36 will continue thereafter, thereby producing output pulse 46 until the voltage level of the sinusoidal component of signal 53 increases enough to turn transistor 36 off. Signal 43 is applied to the emitter of transistor 36 in order to delay the turn off of transistor 36 slightly so that a pulse of sufficient width is produced. Keying pulse 46 is then applied to terminals 55 and 56 of luminance and chrominance processing circuits 13 and 14, respectively, to energize circuits such as those previously described.

When the received video signal is weak or noisy, the horizontal sync pulses 50 may be of low amplitude, distorted or even obliterated by noise. The magnitude of the sync pulse component in signal 53 may therefore be small or insignificant. In situations such as these, signal 34 is applied effectively unmodified, to the base of transistor 36. Transistor 36 will then become conductive when the voltage level of signal 34 decreases sufficiently to turn transistor 36 on. This will occur somewhat earlier in time compared to the condition in which a significant sync pulse component exists, resulting in a slightly wider output keying pulse 46.

The previously described pulse generator 26 will therefore produce a keying pulse 46 under all signal conditions. The timing of the pulse 46 is normally determined by horizontal synchronizing pulses, which occur at substantially invariant intervals. Under severe signal conditions, however, pulse 46 timing is determined by horizontal retrace pulses, thereby insuring that a pulse 46 is generated.

Figure 2:
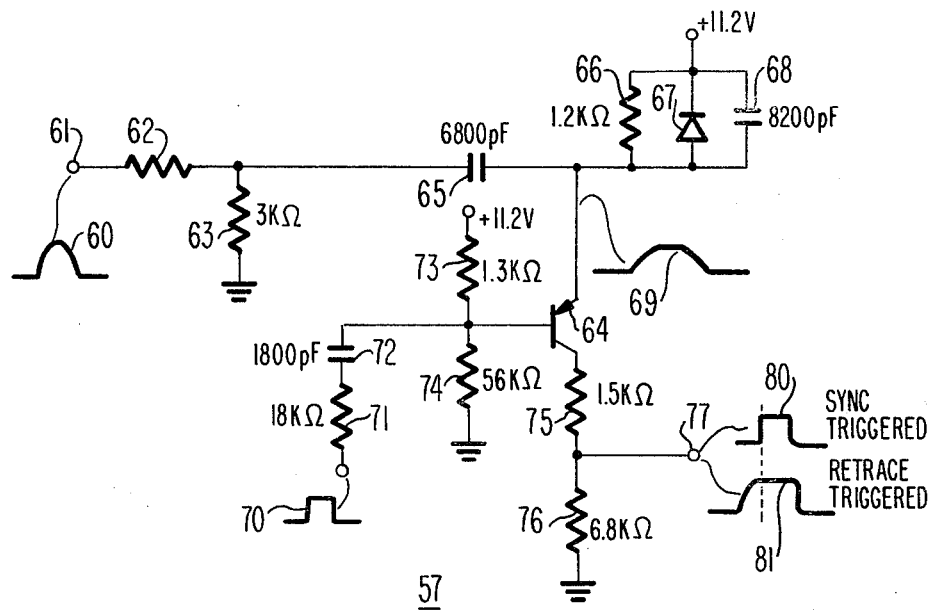
FIG. 2 is a schematic diagram of one embodiment of the pulse generator shown in FIG. 1.

FIG. 2 illustrates a practical circuit embodiment of a pulse generator 57 similar to pulse generator 26 shown in FIG. 1. Horizontal flyback or retrace pulse 60, having an amplitude of approximately 500 volts, is applied to terminal 61 of pulse generator 57. Pulse 60 is divided by variable resistor 62 and resistor 63, and ac coupled as pulse 69 to the emitter of a transistor 64 via a capacitor 65. The emitter of transistor 64 is also coupled to a $+11.2$ volt supply by way of the parallel combination of resistor 66, diode 67 and capacitor 68. Horizontal sync pulses 70 are ac coupled to the base of transistor 64 through a resistor 71 and a capacitor 72. The base of transistor 64 is also referenced to the $-11.2$ volt supply through a resistor 73 and to ground through a resistor 74. The collector of transistor 64 is coupled to ground through resistors 75 and 76. The junction of resistors 75 and 76 is coupled to an output terminal 77, at which appears the desired output pulse 80.

The divided down retrace pulse 69 raises the emitter voltage of transistor 64 above the supply voltage. The values of circuit components, including the values of variable resistor 62 and resistor 63 are selected so that the emitter voltage of transistor 64 does not rise above the base voltage sufficient to turn transistor 64 on before sync pulse 70 can appear at the base. Under relatively strong, noise-free signal conditions, the magnitude of sync pulse 70 coupled to the base of transistor 64 is sufficient to keep transistor 64 off during the duration of the sync pulse. At the termination of sync pulse 70, transistor 64 turns on, producing an output pulse 80 at terminal 77. Transistor 64 turns off when the level of pulse 69 drops to a point at which the base-emitter junction of transistor 64 is no longer forward biased. Diode 67 clamps the pulse 69 so that retrace pulse amplitude differences, e.g., due to pincushion distortion-correction, do not significantly change the width of output pulse 80. The delay between the termination of sync pulse 70 and start of pulse 80 can be adjusted by the selection of values for capacitor 68, and resistors 73 and 74.

As the strength of the received signal decreases, the magnitude of sync pulse 70 coupled to the base of transistor 64 also decreases. This results in the sync pulse having less control over the trigger point of transistor 64. With very weak signals, the sync pulse component will not exist and pulse 69 will completely control the operation of transistor 64, producing a retrace pulse-timed output pulse 81 at terminal 77. Pulse 81 will have a slightly longer duration than pulse 80.

Figure 3:
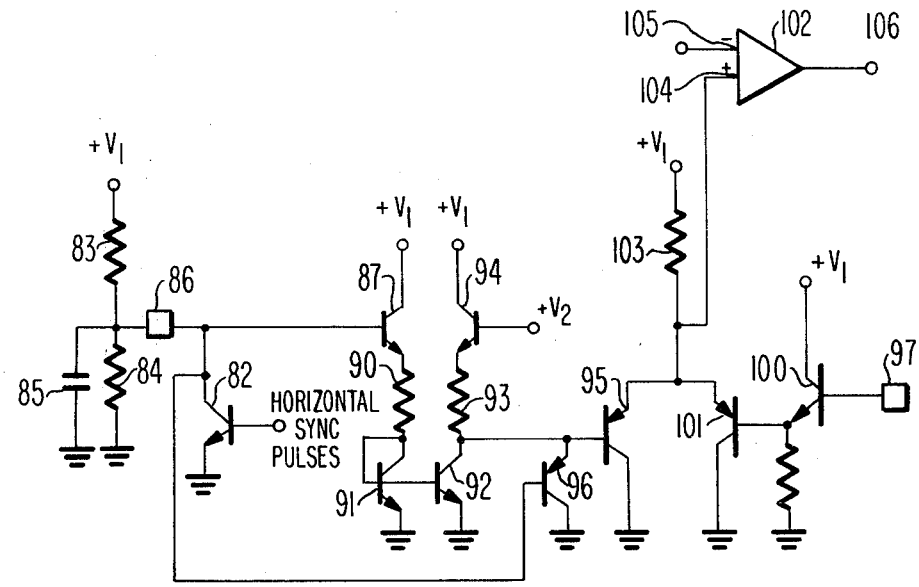
FIG. 3 is a schematic diagram of another embodiment of the pulse generator shown in FIG. 1.

FIG. 3 illustrates another embodiment of a pulse generator similar to the pulse generator 26 shown in FIG. 1. The pulse generator of FIG. 3 is suitable for construction as a portion of an integrated circuit. Appropriate circuit interface terminals are illustrated. The pulse generator of FIG. 3 may conveniently be incorporated as a part of an integrated circuit which provides horizontal and vertical deflection signals, so that the particularly timed and shaped waveforms required by the pulse generator are readily available.

Figure 4:
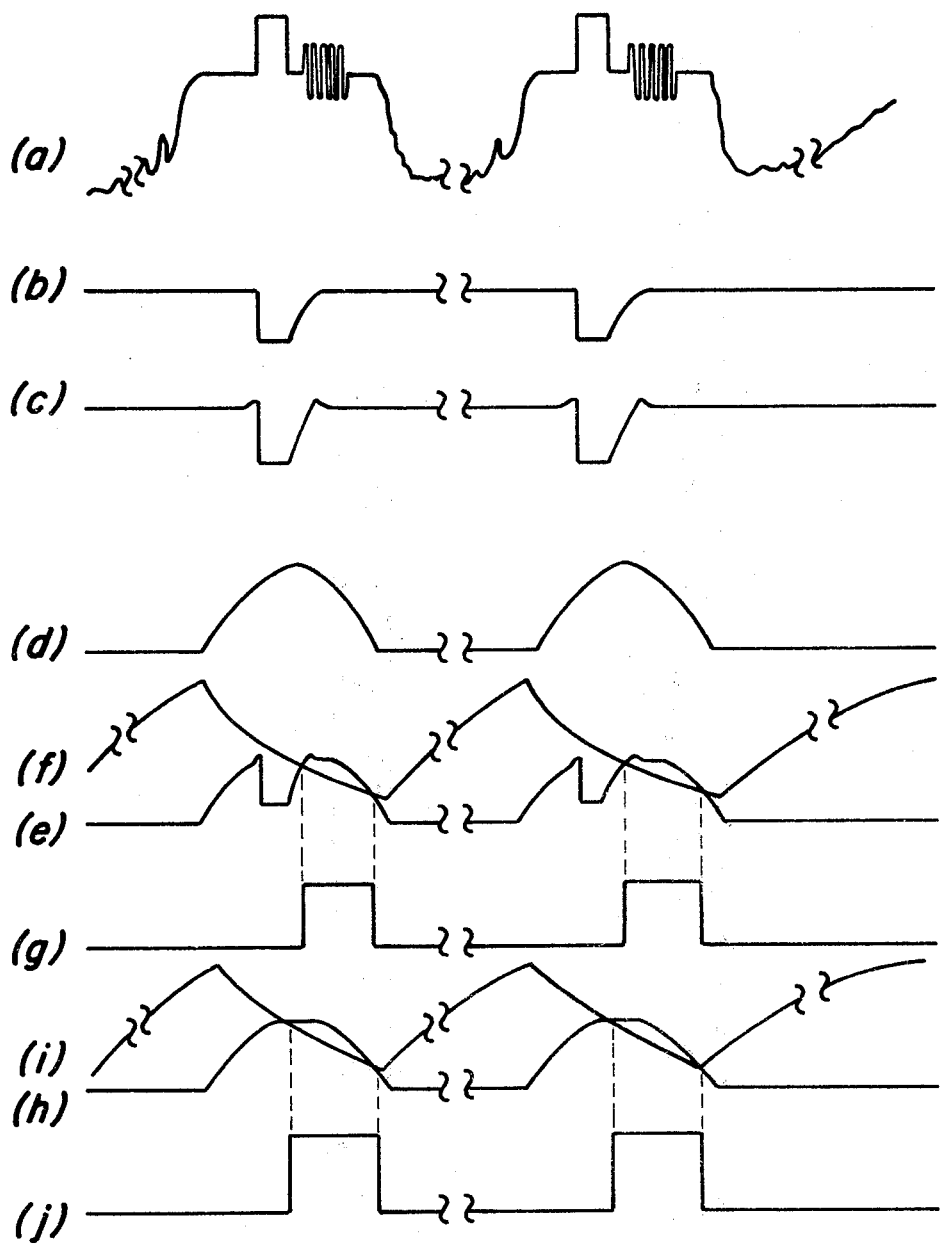
FIGS. 4a-4j illustrate waveforms associated with the pulse generator of FIG. 3.

Horizontal synchronizing pulses are applied to the base of a transistor 82. These sync pulses may be provided by some other portion of the integrated circuit. A direct voltage is provided by components external to the integrated circuit. The value of this direct voltage of the order of 5 volts is determined by the ratio of resistors 83 and 84 and the value of the +V supply, of the order of 8 volts. This direct voltage is applied to interface terminal 86. The direct voltage is combined with the sync derived pulse at the collector of transistor 82 to form a signal such as that shown in FIG. 4b. The notch in the signal contributed by the sync-derived signal at the collector of transistor 82 has a trailing edge whose rise time is determined by the charging time constant of capacitor 85. FIG. 4a illustrates a portion of the composite video signal for reference. The combined signal of FIG. 4b is applied to the base of a transistor 87. Transistors 87, 91, 92 and 94, and resistors 90 and 93 form a ratio current mirror which reduces the magnitude of the signal at the collector of transistor 92 with respect to the signal at the base of transistor 87.

Sync-derived pulses at the collector of transistor 82 are also applied to the base transistor 96, the collector-emitter path of which is coupled in parallel with the collector-emitter path of transistor 92. The sync pulse derived signal applied to transistor 96 amplifies the notch of the signal at the collector of transistor 92 to form the signal shown in FIG. 4c. This signal is applied to the base of a transistor 95.

Horizontal retrace pulses having a peak to peak amplitude, for example, of 5 volts, are applied to an interface terminal 97 which is coupled to the base of a transistor 100. A retrace pulse derived signal at the emitter of transistor 100, shown in FIG. 4d, is then applied to the base of transistor 101. The emitters of transistors 95 and 101 are connected together, and are coupled to an input 104 of a comparator 102, and to the +V$_1$ supply via a resistor 103 which provides a source of current to transistors 95 and 101. Transistors 95 and 101 are connected as a non-additive mixer which combines the signals present at the bases of transistors in such a manner that the lower amplitude signal is applied to input 104. This combination produces a signal at input 104 of comparator 102 such as that shown in FIG. 4e. Input 105 of comparator 102 receives a horizontal rate ramp signal shown in FIG. 4f generated in another portion of the integrated circuit, which decreases during the horizontal retrace interval.

The negative going portion of the ramp signal of FIG. 4f at input 105 intersects the rising edge of the notch in the signal at input 104. During intersection, comparator 102 produces an output pulse shown in FIG. 4g which may be applied to luminance and chrominance processing circuits such as those previously described. By adjusting the characteristics of the rising edge of the notch via capacitor 85 and resistors 83 and 84, the delay between termination of horizontal sync and the beginning of the output pulse can be controlled. Under weak signal conditions when little or no sync pulse is present, the signal at input 104 will not have a notch, but will be merely a clipped retrace pulse, shown in FIG. 4h. The negative going portion of the ramp signal shown in FIG. 4i at input 105 then intersects this pulse at a point earlier in time with respect to a strong signal pulse. The pulse formed under no-sync conditions, shown in FIG. 4j, is therefore of longer duration than a pulse formed under sync-present conditions.

The keying pulse generators of FIGS. 1, 2 and 3 derive pulses timed with respect to horizontal sync under normal conditions. In order to provide an output pulse under weak signal conditions also, each of the pulse generators produces a pulse timed with respect to the horizontal retrace pulse in the absence of horizontal sync.

What is claimed is:
1. In a television receiver incorporating a source of horizontal retrace pulses, a source of composite video signals incorporating a back porch interval and a source of horizontal synchronizing pulses, apparatus for generating a keying pulse during said back porch interval of a given horizontal line comprising:

first means, incorporating a control terminal and responsive to the presence at said control terminal of one of said horizontal retrace pulses for being turned on by said retrace pulse, said first means producing said keying pulse when turned on, said first means also responsive to said retrace pulse for being turned off by said retrace pulse after a predetermined interval such that said first means produces said keying pulse in response to said retrace pulse;

second means, coupled to said source of horizontal synchronizing pulses and to said control terminal of said first means, for delaying the turn on of said first means substantially until the termination of said synchronizing pulse of said given horizontal line such that said synchronizing pulse controls the initiation of said keying pulse when said synchronizing pulse is present.

2. Apparatus for producing a keying pulse during the back porch interval of a composite video signal comprising:
keying pulse producing means responsive to horizontal synchronizing pulses for producing said keying pulse so long as the amplitude of said synchronizing pulses exceeds a predetermined level, said keying pulse producing means also responsive to horizontal retrace pulses for producing said keying pulse even when the amplitude of said synchronizing pulses is below said predetermined level.

3. Apparatus for generating a keying pulse during a portion of a composite video signal comprising:
keying pulse producing means;
a source of first signal pulses coupled to a control terminal of said keying pulse producing means, said first signal pulses capable of energizing said keying pulse producing means in order to generate said keying pulse; and
a source of second signal pulses coupled to said control terminal of said keying pulse producing means, said second signal pulses capable of disabling said keying pulse producing means in order to delay the initiation of said keying pulse.

4. The arrangement defined in claim 3 wherein said first signal pulses comprise horizontal retrace pulses.

5. The arrangement defined in claim 3 wherein said second signal pulses comprise horizontal synchronizing pulses.

6. The arrangement defined in claim 3 wherein said pulse producing means comprises a transistor.

7. The arrangement defined in claim 3 wherein said pulse producing means comprises a comparator.

8. Apparatus for producing a keying pulse during a portion of a composite video signal comprising:
a source of horizontal retrace pulses;
a source of horizontal synchronizing pulses;
means for combining said horizontal retrace pulses and said horizontal synchronizing pulses to produce a combined signal having components derived from said retrace pulses and said synchronizing pulses;
comparator means having first and second input terminals and an output terminal;
a source of horizontal rate signals coupled to said first terminal of said comparator;
means for applying said combined signal to said second terminal of said comparator for producing said keying pulses at said output terminal when the amplitude of said combined signal is greater than the amplitude of said horizontal rate signal, said synchronizing pulse component of said combined signal acting to reduce the amplitude of said combined signal.

9. A keying pulse generator for a television receiver, comprising:
threshold means for generating a keying pulse when a threshold is exceeded;
a source of horizontal sync pulses derived from a composite video signal, said sync pulses having an amplitude dependent upon receiving conditions;
first coupling means for coupling said source of horizontal sync pulses to said threshold means, whereby said keying pulses are generated reliably in response to said horizontal sync pulses during good receiving conditions and may be generated unreliably in response to said horizontal sync pulses during poor receiving conditions, thereby adversely affecting the operation of said receiver;
horizontal deflection means for generating periodic retrace pulses in response to drive pulses;
horizontal oscillator means coupled to said source of horizontal sync pulses for generating drive pulses at the average rate of said horizontal sync pulses;
second coupling means for coupling said horizontal oscillator means to said horizontal deflection means for applying said horizontal drive pulses to said horizontal deflection means whereby said horizontal retrace pulses are generated at the average rate of said horizontal sync pulses; and
summing means for coupling said horizontal deflection means with said source of horizontal sync pulses for summing said horizontal retrace pulses with said horizontal sync pulses for generating said keying pulses in response to said horizontal retrace pulses during said poor receiving conditions.

* * * * *